(12) United States Patent  
Huang

(10) Patent No.: US 10,425,679 B2
(45) Date of Patent: Sep. 24, 2019

(54) METHOD AND DEVICE FOR DISPLAYING INFORMATION ON VIDEO IMAGE

(71) Applicant: TENCENT TECHNOLOGY (SHENZHEN) COMPANY LIMITED, Shenzhen (CN)

(72) Inventor: Lihua Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 79 days.

(21) Appl. No.: 15/787,908

(22) Filed: Oct. 19, 2017

(65) Prior Publication Data

US 2018/0041796 A1    Feb. 8, 2018

Related U.S. Application Data

(63) Continuation of application No. PCT/CN2016/102640, filed on Oct. 20, 2016.

(30) Foreign Application Priority Data

Nov. 6, 2015 (CN) .......................... 2015 1 0751308

(51) Int. Cl.
*H04N 21/43* (2011.01)
*H04N 21/431* (2011.01)
(Continued)

(52) U.S. Cl.
CPC ....... *H04N 21/4316* (2013.01); *G06F 16/784* (2019.01); *G06K 9/00228* (2013.01);
(Continued)

(58) Field of Classification Search
CPC ............ H04N 21/4316; H04N 21/4312; H04N 21/8133; H04N 21/44008; H04N 21/812;
(Continued)

(56) References Cited

U.S. PATENT DOCUMENTS 7,184,100 B1* 2/2007 Wilf ...................... G11B 27/28
348/700
7,206,029 B2   4/2007 Cohen-Solal
(Continued)

FOREIGN PATENT DOCUMENTS

CN           1423896 A      6/2003
CN       102845067 A     12/2012
(Continued)

OTHER PUBLICATIONS

Search Report in International Application No. PCT/CN2016/102640 dated Jan. 11, 2017, pp. 4.
(Continued)

*Primary Examiner* — Jerome Grant, II
(74) *Attorney, Agent, or Firm* — Marshall, Gerstein & Borun LLP

(57) ABSTRACT

The present disclosure provides a method and a device for displaying information on a video image, which is applied to a playback device. The playback device is configured to receive an information playing request; analyze an image frame from a currently played video; identify a facial feature from the analyzed image frame; determine a position of the identified facial feature in the image frame, and display received information on a position of the image frame, except for the determined position of the facial feature.

17 Claims, 7 Drawing Sheets

(51) Int. Cl.
*H04N 21/4788* (2011.01)
*G06T 7/70* (2017.01)
*G06K 9/00* (2006.01)
*H04N 21/44* (2011.01)
*H04N 21/488* (2011.01)
*H04N 21/81* (2011.01)
*G06F 16/783* (2019.01)
*G06T 7/13* (2017.01)

(52) U.S. Cl.
CPC ...... *G06K 9/00268* (2013.01); *G06K 9/00711* (2013.01); *G06T 7/70* (2017.01); *H04N 21/4312* (2013.01); *H04N 21/44008* (2013.01); *H04N 21/4788* (2013.01); *H04N 21/4884* (2013.01); *H04N 21/812* (2013.01); *H04N 21/8133* (2013.01); *G06K 2209/21* (2013.01); *G06T 7/13* (2017.01); *G06T 2207/10016* (2013.01); *G06T 2207/30201* (2013.01)

(58) Field of Classification Search
CPC ............ H04N 21/4884; H04N 21/4788; G06F 16/784; G06K 9/00228; G06K 9/00268; G06K 9/00711; G06K 2209/21; G06T 7/70; G06T 7/13; G06T 2207/10016; G06T 2207/30201
USPC ........................................................ 382/103
See application file for complete search history.

(56) References Cited

U.S. PATENT DOCUMENTS

| | | | |
|---|---|---|---|
| 9,241,149 B2 | 1/2016 | Redmann | |
| 2012/0323704 A1* | 12/2012 | Steelberg | G06Q 30/02 705/14.73 |
| 2014/0184721 A1* | 7/2014 | Zhang | H04N 7/15 348/14.02 |
| 2014/0196082 A1 | 7/2014 | Maruyama et al. | |

FOREIGN PATENT DOCUMENTS

| | | | |
|---|---|---|---|
| CN | 105430512 A | 3/2016 | |
| JP | 2004128614 A | 4/2004 | |
| JP | 2007-274207 A | 10/2007 | |
| JP | 2010-226351 A | 10/2010 | |
| JP | 2010226351 | * 10/2010 | ............... H04N 5/91 |

OTHER PUBLICATIONS

International Preliminary Report on Patentability and Written Opinion in International Application No. PCT/CN2016/102640 dated May 8, 2018, 11 pages.

Office Action in JP Application No. 2017-560519 dated Jul. 17, 2018, 9 pages.

* cited by examiner

METHOD AND DEVICE FOR DISPLAYING INFORMATION ON VIDEO IMAGE

CROSS-REFERENCE TO RELATED APPLICATIONS

This application is a U.S. continuation of International Application No. PCT/CN2016/102640, filed Oct. 20, 2016. This application claims the benefit and priority of Chinese Patent Application No. 201510751308.4, filed Nov. 6, 2015. The entire disclosures of each of the above applications are incorporated by reference.

TECHNICAL FIELD

The present disclosure relates to video technologies, and more particularly, to a method and a device for displaying information on a video image.

BACKGROUND

Barrage refers to comments directly displayed on a video, which may be displayed on a video by scrolling, staying, or even more action effects. The barrage is a short comment sent by a person who watches the video. A barrage video is a video carrying "barrage". At present, many websites provide functions about transmitting a barrage on a video, such as, niconico, acfun, bilibili, dilili, tucao, burst point TV, and so on.

In general, such websites allow a person watching a video to make comments or thoughts. However, different from being displayed on a dedicated comment area of a player in an ordinary video sharing website, barrage of such websites may be displayed in-time on a video screen, by sliding subtitles. Subsequently, it is guaranteed that all the viewers can notice the barrage, thereby implementing interactions among viewers, or enabling viewers even to express praise or criticism for a work, and increasing the fun of watching.

Since barrage information may randomly occur on a video screen conventionally, that is, at any position of the video screen, the barrage may block important video contents, e.g., block key information in a video image, such as a face.

SUMMARY

In view of above, the present disclosure provides a method and a device for displaying information on a video image, which may display information by avoiding facial features on the video image, avoid facial feature display information in the video image, and improve video-image processing functions of a playback device.

To solve foregoing technical problems, technical solutions of the present disclosure are as follows.

A method for displaying information on a video image, which is applied to a playback device, including:

receiving, by the playback device, an information playing request;

analyzing, by the playback device, an image frame from a currently played video;

identifying, by the playback device, a facial feature from the analyzed image frame;

determining, by the playback device, a position of the identified facial feature in the image frame; and, displaying, by the playback device, received information on a position of the image frame, except for the determined position of the facial feature.

A device for displaying information on a video image, which is applied to a playback device, including a processor and a memory, wherein the memory stores a receiving unit, an analyzing unit, an identifying unit, a determining unit and a displaying unit, when being executed by the processor, the receiving unit is configured to receive an information playing request;

the analyzing unit is configured to analyze an image frame from a currently played video;

the identifying unit is configured to identify a facial feature from the image frame;

the determining unit is configured to determine a position of the identified facial feature in the image frame; and, the displaying unit is configured to display received information on a position of the image frame, except for the determined position of the facial feature.

A non-transitory computer storage medium, which stores a computer program, and the computer program is configured to execute foregoing method.

BRIEF DESCRIPTIONS OF THE DRAWINGS

DETAILED DESCRIPTIONS

To make objectives, technical solutions and advantages of the present disclosure more clear, detailed descriptions about technical solutions of the present disclosure will be provided in the following, accompanying with attached figures and embodiments.

An embodiment of the present disclosure provides a method for displaying information on a video image, which is applied to a playback device, e.g., an application (which is also referred to as a media player) for playing a media file running on a user terminal, such as, a mobile phone, a Personal Computer (PC). When receiving an information playing request, the playback device analyzes an image frame from the currently played video, identifies a facial feature from the image frame, and displays the received information on a position except for the facial feature's position. Subsequently, information may be displayed by avoiding a facial feature on a video image, and video-image processing functions of a playback device may be improved.

In an embodiment of the present disclosure, the facial feature may be a face, or a head of an animal, and so on. In a specific implementation, such facial feature may be preset as key information according to actual requirements, such as, it is expected that subtitle information is not blocked, and then, the subtitle information may be set as corresponding key information. The foregoing contents are only an example, which is not limited to foregoing facial feature.

Information received by the playback device may be at least one of: subtitle information, advertisement information, barrage information, picture information. In a specific implementation of an embodiment of the present disclosure, the foregoing list information is not limited.

In an embodiment of the present disclosure, a process for displaying information on a video image will be described in detail in the following, accompanying with attached figures.

Figure 1:
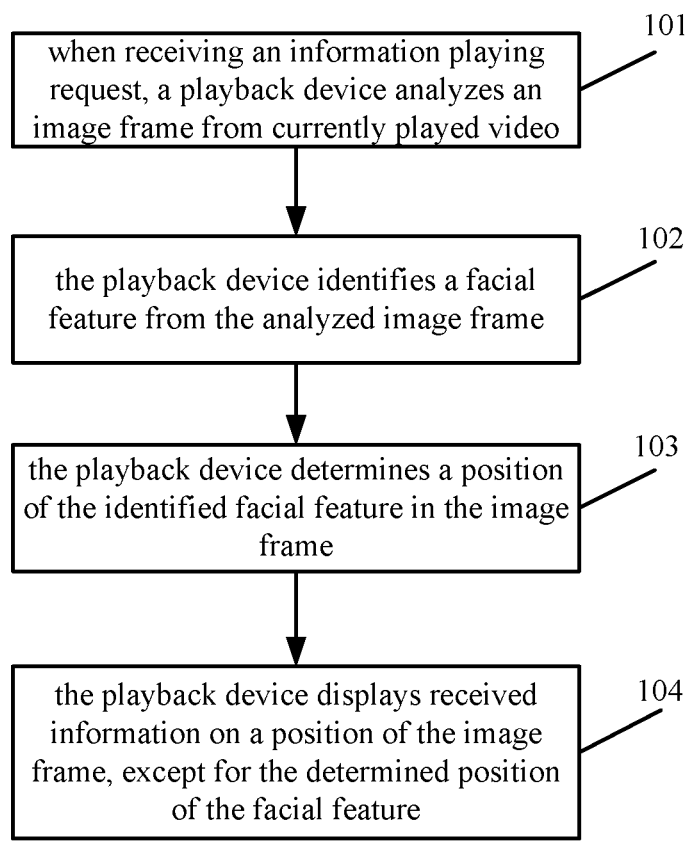
FIG. 1 is a flowchart illustrating a method for displaying information on a video image, in accordance with an embodiment of the present disclosure.

With reference to FIG. 1, FIG. 1 is a flowchart illustrating a method for displaying information on a video image, in accordance with an embodiment of the present disclosure.

In block 101, when receiving an information playing request, a playback device analyzes an image frame from currently played video.

In block 102, the playback device identifies a facial feature from the analyzed image frame.

In the embodiment of the present disclosure, on the basis of characteristics of a facial feature to be identified, an image identifying method is pre-configured, e.g., when the facial feature is a face, a face identifying method is used to identify the facial feature.

In block 103, the playback device determines a position of the identified facial feature in the image frame.

For the facial feature identified in the block, the position of the facial feature in the image frame is marked by an area, which corresponds to pixels at edge positions of the facial feature in the image frame.

For example, regarding x axis, it is from the $n^{th}$ pixel to the $m^{th}$ pixel; regarding y axis, it is from the $p^{th}$ pixel to the $q^{th}$ pixel, an image within such range corresponds to a facial feature. The representation mode of position here is only an example. In a specific implementation, an identification of position mode is not limited. In a specific implementation, in order to accurately determine the position of facial feature, position of the facial feature may be identified by an area, which corresponds to multiple pixels with vertical and horizontal coordinates.

In a specific implementation of the present disclosure, blocks 102 and 103 may be executed by a playback device. A server may be added to implement such functions. Such functions may also be added to an existing server.

In block 104, the playback device displays the received information on a position of the image frame, except for the determined position of the facial feature.

A specific mode for displaying the received information on the image frame by the playback device may be as follows. The received information may be displayed, based on characteristics of the information. For example, when the received information is barrage information, the barrage information may be drawn on a position, except for the position of the facial feature.

When displaying the received information on the video image by the playback device, the received information is displayed by avoiding the identified position of the facial feature, which is different from that being displayed conventionally. A specific mode for displaying the received information is not limited by the embodiments of the present disclosure. The received information may be displayed horizontally, or vertically, according to actual requirements or artistic.

Figure 2:
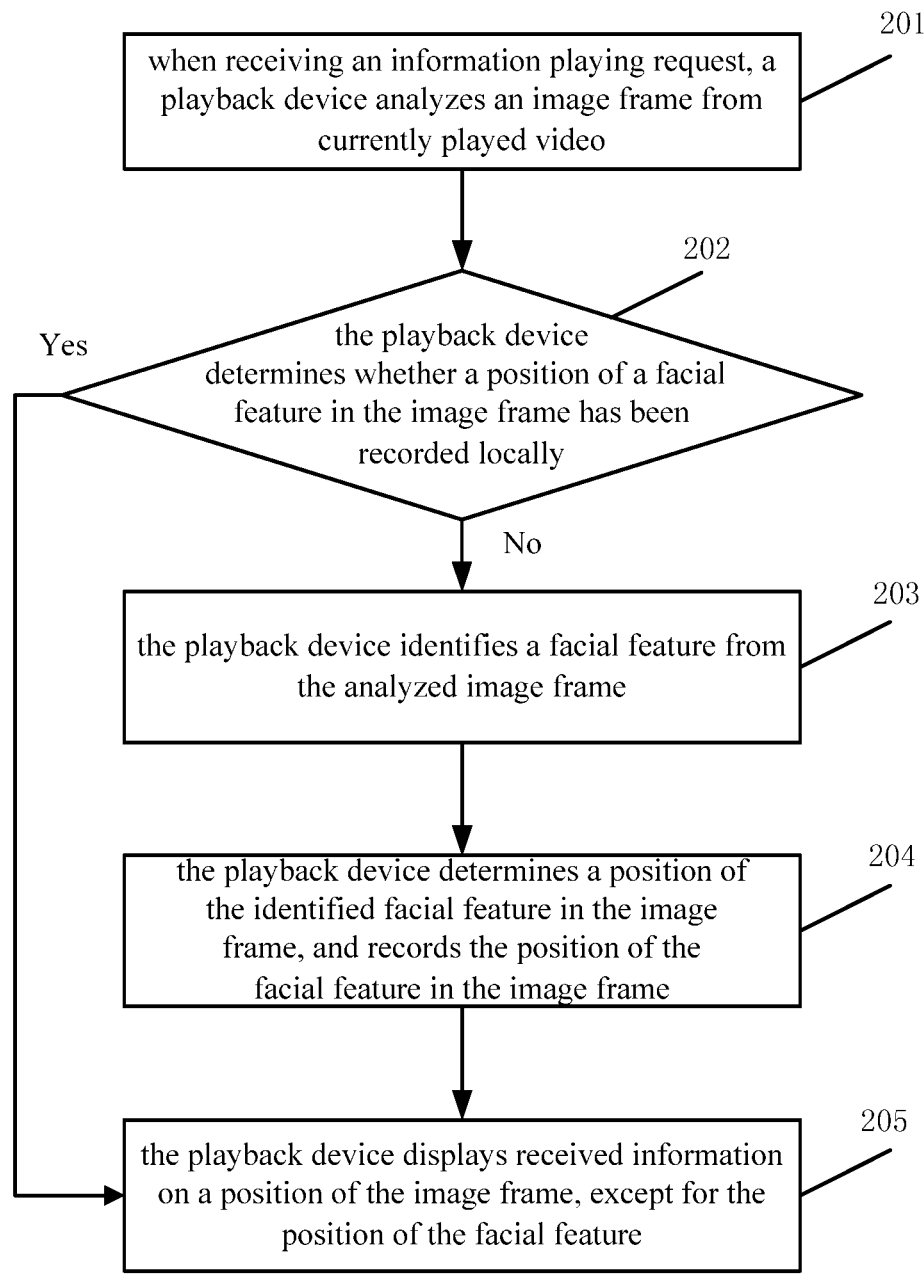
FIG. 2 is a flowchart illustrating a method for displaying information on a video image, in accordance with an embodiment of the present disclosure.

With reference to FIG. 2, FIG. 2 is a flowchart illustrating a method for displaying information on a video image, in accordance with an embodiment of the present disclosure. Specific blocks are as follows.

In block 201, when receiving an information playing request, a playback device analyzes an image frame from currently played video.

In block 202, the playback device determines whether a position of a facial feature in the image frame has been recorded locally, if yes, proceed with block 205; otherwise, proceed with block 203.

In block 203, the playback device identifies the facial feature from the analyzed image frame.

In a specific implementation, when the facial feature is not identified in the analyzed image, it is recorded that there is no facial feature in the image frame, and then, the received information may be displayed on any position of the image frame. That is, the received information may be displayed, according to a conventional mode.

In block 204, the playback device determines the position of the identified facial feature in the image frame, and then records the position of the facial feature of the image frame.

In block 205, the playback device displays the received information on a position of the image frame, except for the position of the facial feature.

In the embodiment, when firstly identifying the facial feature in one image frame, the position of the identified facial feature in the image frame is recorded. When playing such image frame and other information is received once again, it is not necessary to identify the facial feature once again. The position of the facial feature in the image frame may be directly obtained. Subsequently, time and resources of a device may be saved.

Figure 3:
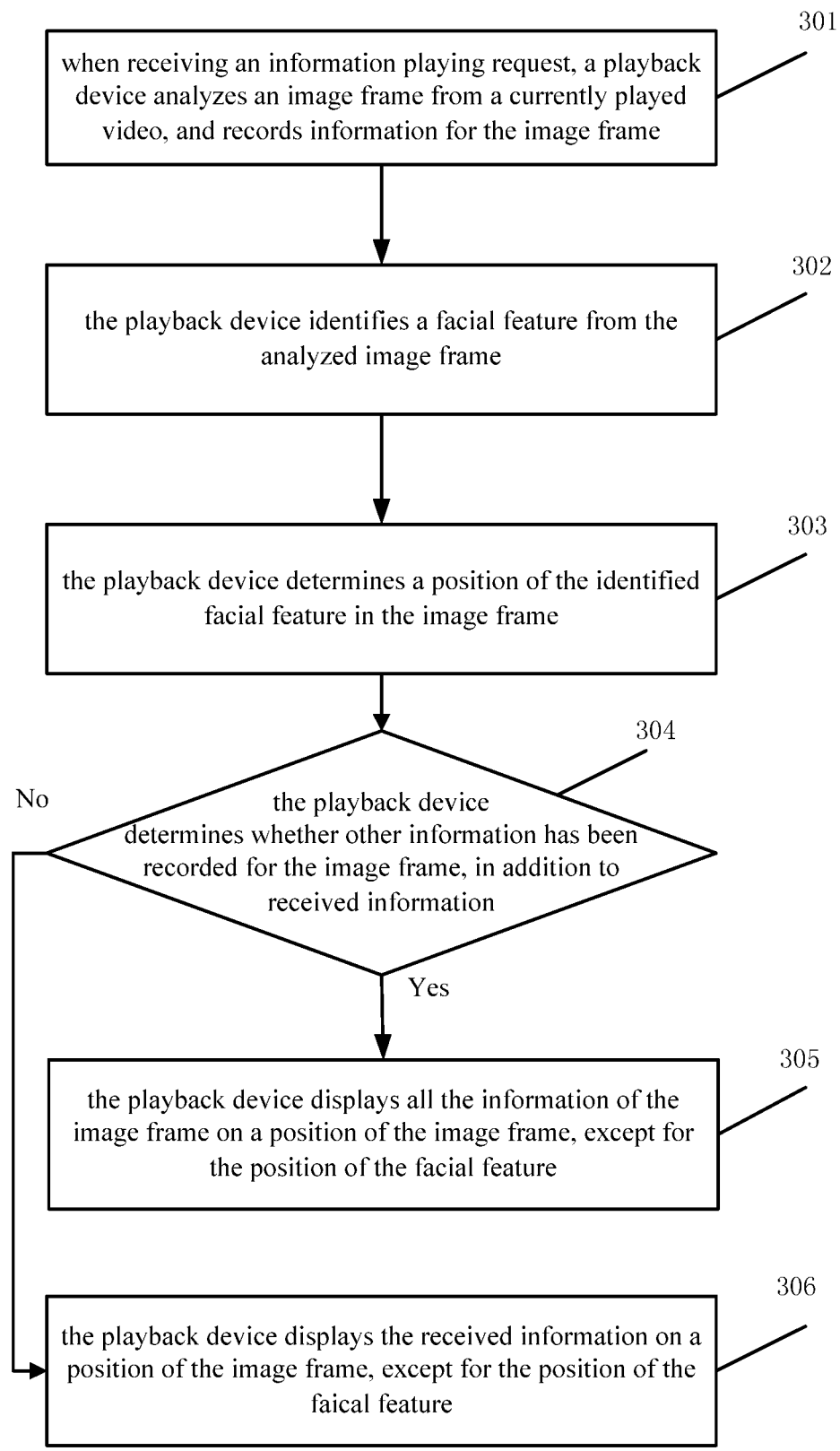
FIG. 3 is a flowchart illustrating a method for displaying information on a video image, in accordance with an embodiment of the present disclosure.

With reference to FIG. 3, FIG. 3 is a flowchart illustrating a method for displaying information on a video image, in accordance with an embodiment of the present disclosure. The specific blocks are as follows.

In block 301, when receiving an information playing request, a playback device analyzes an image frame from currently played video, and records the information for such image frame.

In block 302, the playback device identifies a facial feature from the analyzed image frame.

In block 303, the playback device determines the position of the identified facial feature in the image frame.

In block 304, the playback device determines whether other information has been recorded for such image frame, in addition to the received information; when determining that other information has been recorded for such image frame, in addition to the received information, proceed with block 305; otherwise, proceed with block 306.

In block 305, the playback device displays all the information about the image frame on positions of the image frame, except for the determined position of the facial feature.

In block 306, the playback device displays the received information on a position of the image frame, except for the determined position of the facial feature.

In the embodiment, for one image frame, the received information is recorded. When playing the image frame once again, if an information playing request is received once again, all the information recorded for the image frame is displayed on positions of the image frame, except for foregoing position of the facial feature. By adopting such technical solution, user experience may be improved. For example, regarding barrage information on a video, when a certain image frame is played, during viewing processes of different users, all the barrages destined for such image frame are displayed.

Figure 4:
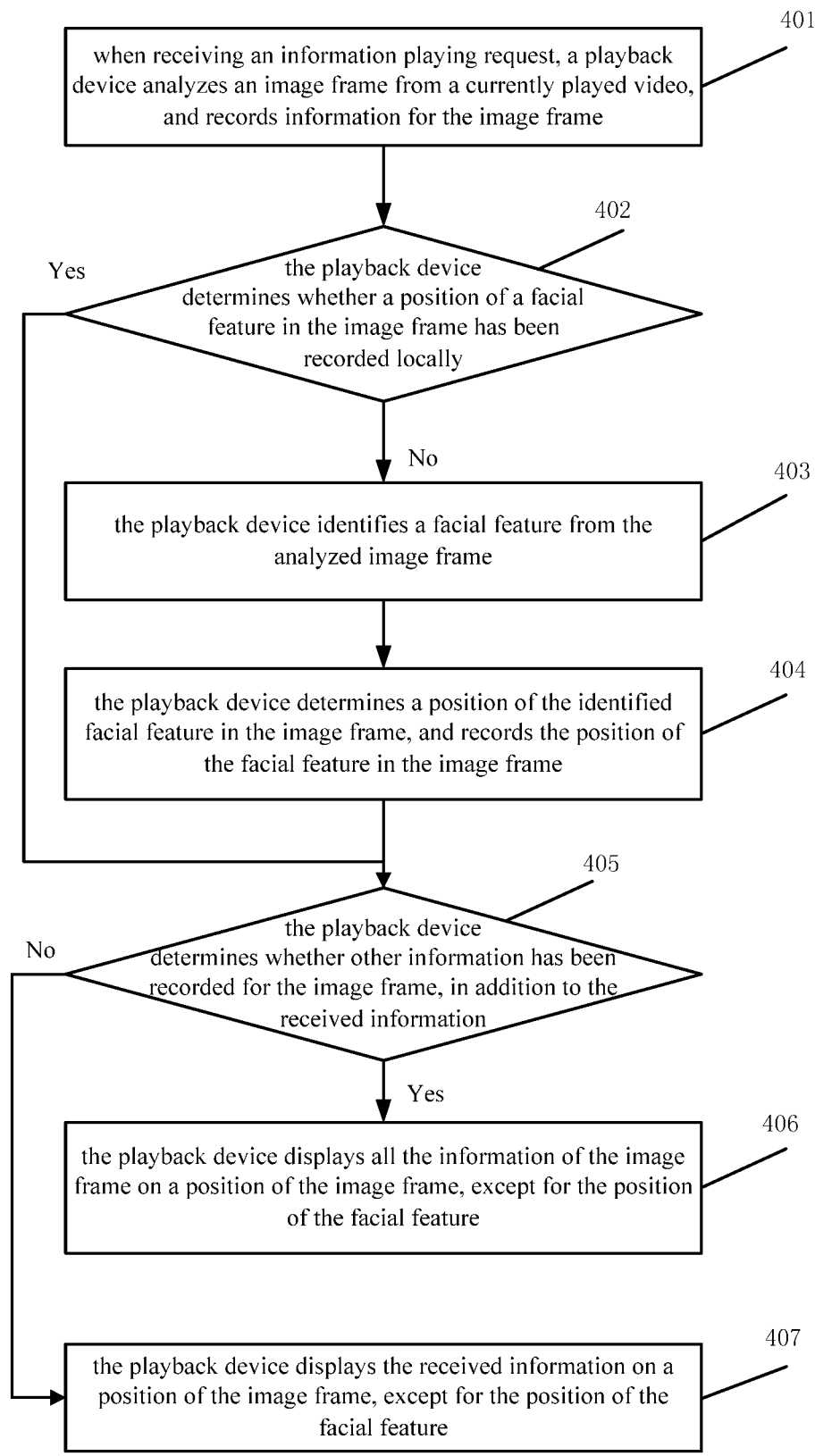
FIG. 4 is a flowchart illustrating a method for displaying information on a video image, in accordance with an embodiment of the present disclosure.

With reference to FIG. 4, FIG. 4 is a flowchart illustrating a method for displaying information on a video image, in accordance with an embodiment of the present disclosure. The specific blocks are as follows.

In block 401, when receiving an information playing request, a playback device analyzes an image frame from currently played video, and records the information for such image frame.

In block 402, the playback device determines whether a position of a facial feature in the image frame has been recorded locally; when determining that the position of the facial feature in the image frame has been recorded locally, proceed with block 405; otherwise, proceed with block 403.

In block 403, the playback device identifies the facial feature from the analyzed image frame.

In block 404, the playback device determines a position of the identified facial feature in the image frame, and records the position of the facial feature in the image frame.

In block 405, the playback device determines whether other information has been recorded for such image frame, in addition to the received information; when determining that other information has been recorded for such image frame, in addition to the received information, proceed with block 406, otherwise, proceed with block 407.

In block 406, the playback device displays all the information about the image frame on positions in the image frame, except for the determined position of the facial feature, and terminates the process.

In block 407, the playback device displays the received information on a position of the image frame, except for the determined position of the facial feature.

By adopting the technical solution in the embodiment, time for identifying the facial feature and resources of a device may be saved, meanwhile user experience is improved.

Accompanying with attached figures, a process for displaying information on a video image is described in detail in the following by using an example, in which the received information is barrage information.

Figure 5:
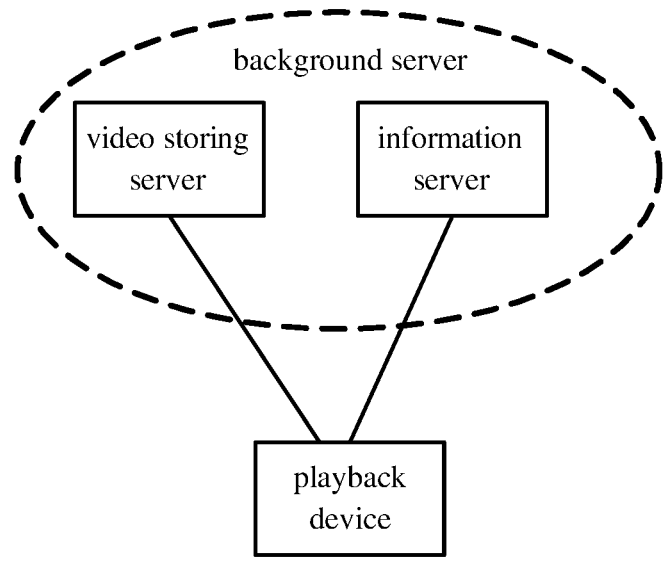
FIG. 5 is a schematic diagram illustrating a structure of a video playing system, in accordance with an embodiment of the present disclosure.

With reference to FIG. 5, FIG. 5 is a schematic diagram illustrating a structure of a video playing system, in accordance with an embodiment of the present disclosure. In FIG. 5, a video storing server is configured to provide video data for a playback device. An information server is configured to provide information requesting to be played for the playback device. In a specific implementation, the video storing server and the information server may be one server, or multiple servers, which is not limited by specific implementations of embodiments in the present disclosure, and can be implemented conventionally.

The video storing server is further configured to transmit a video to be played to the playback device.

When receiving the video from the video storing server, if it is determined that the video is audio-video, the playback device needs to separate video data, which corresponds to the received video, into audio data and video data, decodes the audio data and outputs voice. After decoding the video data, the playback device outputs a video image. No matter whether the received information is displayed, synchronization of voice and image is not changed here, which may be implemented conventionally.

In the embodiment of the present disclosure, when receiving barrage information from a user via a client, the information server is configured to transmit the barrage information to the playback device.

When receiving the barrage information from the information server, the playback device analyzes an image frame from currently played video, and records the received barrage information for such image frame.

For the image frame, the playback device is further configured to determine, whether a position of facial feature in the image frame has been recorded; when determining that the position of the facial feature in the image frame has been recorded, the playback device is further configured to determine whether other information, in addition to the received information, is recorded for such image frame.

When recording the position of the facial feature in the image frame, the playback device is further configured to display corresponding barrage information, which is recorded for such image frame, on a position except for the position of the facial feature.

When the playback device does not record the position of the facial feature in the image frame, the playback device is further configured to identify the facial feature from the analyzed image frame; determine the position of the identified facial feature in the image frame, and record the position of the facial feature in the image frame, and then display all the corresponding barrage information, which is recorded for such image frame, on a position except for the position of the facial feature.

The foregoing content is only an example for displaying barrage information on a video image to be played, which is not limited by a specific implementation of the present disclosure. When being implemented conventionally, it is determined that whether barrage information needs to be displayed on a video image frame to be played.

Figure 6:
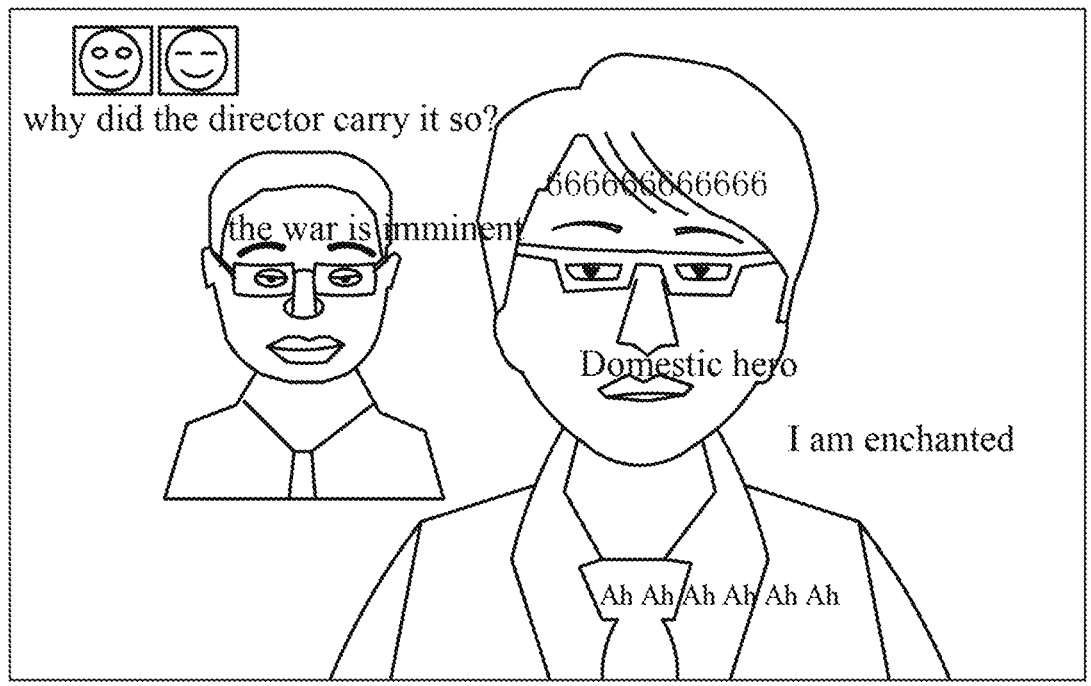
FIG. 6 is a schematic diagram illustrating how to display barrage information on a video image conventionally.

With reference to FIG. 6, FIG. 6 is a schematic diagram illustrating how to display barrage information on a video image conventionally.

Figure 7:
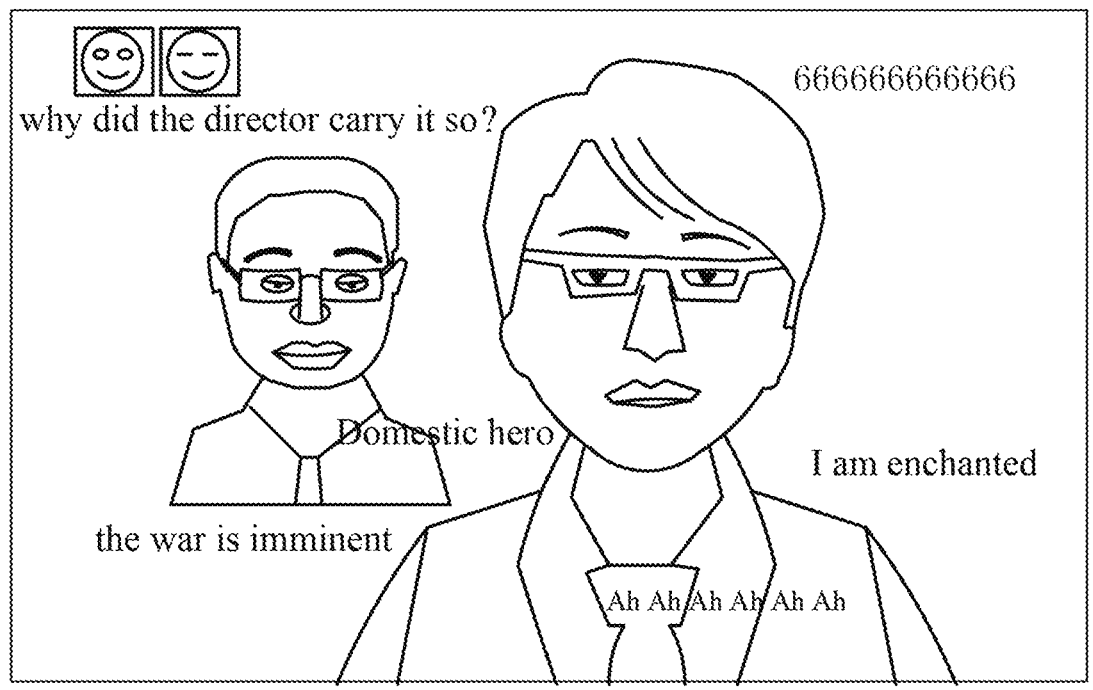
FIG. 7 is a schematic diagram illustrating how to display barrage information on a video image, in accordance with an embodiment of the present disclosure.

With reference to FIG. 7, FIG. 7 is a schematic diagram illustrating how to display barrage information on a video image, in accordance with an embodiment of the present disclosure.

FIG. 6 and FIG. 7 are schematic diagrams illustrating how to display the same barrage information on the same frame of a video image, and the facial feature is face information in foregoing examples.

On the basis of FIG. 6 and FIG. 7, it can be seen that, in the existing implementation process, the barrage information (the war is imminent, domestic hero and 666666666666) in FIG. 6 will be displayed on a face, which is not beneficial for watching a video by a user. After processing by using an implementation mode in the embodiment of the present disclosure, foregoing barrage information in FIG. 7 will not be displayed on a face, which improves the experience for watching a video by a user. Thus, by adopting the technical solution in the present disclosure, video-image processing functions of a playback device may be improved, and information may be displayed without affecting watching experience of a user.

Figure 8:
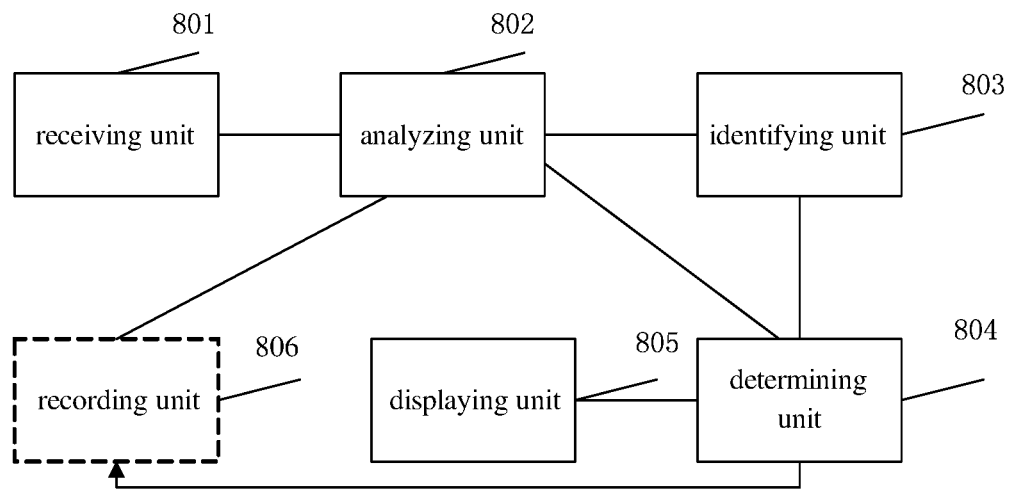
FIG. 8 is a schematic diagram illustrating a structure of a device, to which foregoing technology is applied, in accordance with an embodiment of the present disclosure.

On the basis of the same conception, the present disclosure also provides a device for displaying information on a video image, which is applied to a playback device. With reference to FIG. 8, FIG. 8 is a schematic diagram illustrating a structure of a device, to which foregoing technology is applied, in accordance with an embodiment of the present disclosure. The device includes a receiving unit 801, an analyzing unit 802, an identifying unit 803, a determining unit 804 and a displaying unit 805.

The receiving unit 801 is configured to receive an information displaying request.

The analyzing unit 802 is configured to analyze an image frame from currently played video, when the receiving unit 801 receives the information playing request.

The identifying unit 803 is configured to identify a facial feature from the analyzed image frame, which is obtained by the analyzing unit 802.

The determining unit 804 is configured to determine a position of the facial feature in the image frame, in which the facial feature is identified by the identifying unit 803.

The displaying unit 805 is configured to display information received from the receiving unit 801 on a position of the image frame, except for the position of the facial feature determined by the determining unit 804.

Preferably, the device further includes a recording unit 806.

The recording unit 806 is configured to record the position of the facial feature in the image frame, when the determining unit 804 determines the position of the identified facial feature in the image frame.

When the analyzing unit 802 analyzes the image frame from currently played video, the determining unit 804 is further configured to determine, whether the recording unit records the position of the facial feature in the image frame. When determining that the recording unit records the position of the facial feature in the image frame, the determining unit 804 is further configured to trigger the displaying unit 805 to display the received information on a position of the image frame, except for the determined position of the facial feature; otherwise, trigger the identifying unit 803 to identify the facial feature from the analyzed image frame.

The device further includes the recording unit 806.

When the analyzing unit 802 analyzes the image frame from currently played video, the recording unit 806 is further configured to record such information for the image frame.

Before displaying the received information on a position of the image frame, except for the determined position of the facial feature, the displaying unit 805 is further configured to determine, whether other information has been recorded by the recording unit for such image frame, in addition to the received information; when determining that other information has been recorded by the recording unit for such image frame, in addition to the received information, the displaying unit 805 is triggered to display all the information of the image frame on a position of the image frame, except for the determined position of the facial feature; otherwise, the displaying unit 805 is triggered to display the received information on a position of the image frame, except for the determined position of the facial feature.

The position of the facial feature in the image frame may be identified by an area, which corresponds to pixels at edge of the facial feature in the image frame.

The received information may be at least one of: subtitle information, advertisement information, barrage information, picture information.

Units of foregoing embodiment may be integrated into one entity, or may be deployed separately, may be combined into one unit, or may be further divided into multiple sub-units.

Each unit in the embodiments of the present disclosure may be implemented in a mechanical or electronic manner. For example, a hardware module may include a specially designed permanent circuit, or a logic component (such as, a dedicated processor, e.g., Field-Programmable Gate Array (FPGA) or Application Specific Integrated Circuit (ASIC)), so as to complete a specific operation. The hardware module may also include a programmable logic component or circuit (e.g., including a general purpose processor, or another programmable processor), which is temporarily configured by software, so as to achieve a specific operation. Whether to implement the hardware module in the mechanical manner, or by using the dedicated permanent circuit, or by using a temporarily configured circuit (e.g., being configured by software), may be determined by cost and time.

Figure 9:
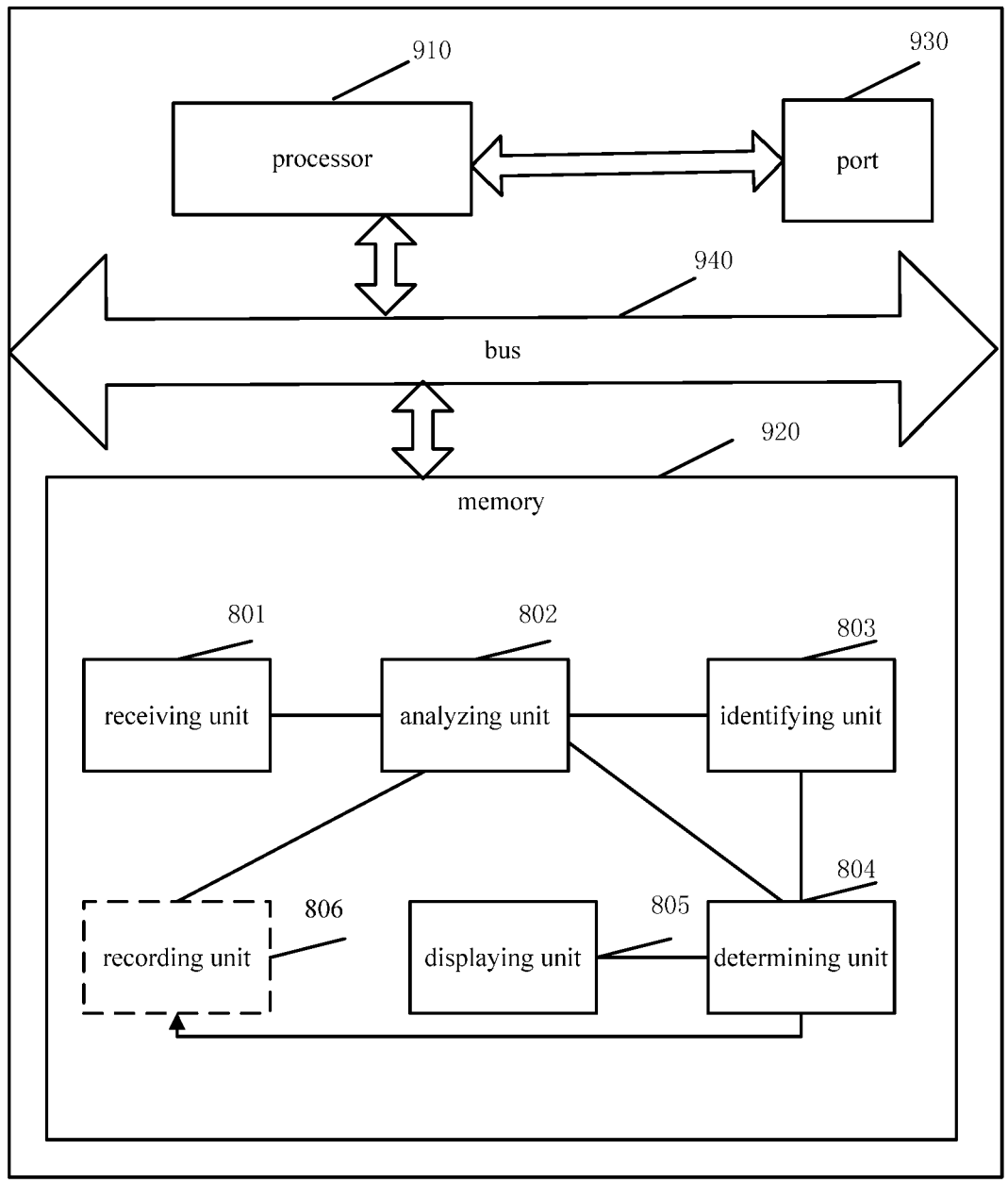
FIG. 9 is a schematic diagram illustrating a hardware structure of a device for displaying information on a video image, in accordance with an embodiment of the present disclosure.

The device for displaying barrage on a video image has been described above, in accordance with embodiments of the present disclosure. The hardware structure of the playback device in the embodiments of the present disclosure will be provided in the following. The device may be a programmable device, which combines software with hardware. With reference to FIG. 9, FIG. 9 is a schematic diagram illustrating a hardware structure of a device for displaying information on a video image, in accordance with an embodiment of the present disclosure. The playback device may include a processor 910, a memory 920, a port 930, and a bus 940. The processor 910 and the memory 920 are interconnected with each other by the bus 940. The processor 910 may obtain and output data via the port 930.

When being executed by the processor 910, the receiving unit 801 may receive an information playing request.

When being executed by the processor 910, the analyzing unit 802 analyzes an image frame from currently played video.

When being executed by the processor 910, the identifying unit 803 may identify a facial feature from the image frame.

When being executed by the processor 910, the determining unit 804 may determine a position of the identified facial feature in the image frame.

When being executed by the processor 910, the displaying unit 805 may display received information on a position of the image frame, except for the position of the facial feature determined by the determining unit 804.

When being executed by the processor 910, the recording unit 806 may record the received information, and record the position of the facial feature in the image frame.

Thus, it can be seen that when instruction modules in the memory 920 are executed by the processor 910, each function of the receiving unit, the analyzing unit, the identifying unit, the determining unit, the displaying unit and the recording unit in foregoing technical solutions can be achieved.

In addition, the embodiments of the present disclosure may be implemented by a device, e.g., a data processing program executed by a computer. It is obvious that the data processing program constitutes the present disclosure. In addition, a data processing program generally stored in a storage medium directly reads a program from the storage medium, or installs or copies the program to a storage device (e.g., hardware, and/or, memory) of a data processing device to be executed. Thus, foregoing storage medium may also constitute the present disclosure. The storage medium may adopt a recording mode of any type, such as, a paper storage medium (e.g., paper tape), a magnetic storage medium (e.g., floppy disk, hard disk, flash memory, and so on), an optical storage media (such as CD-ROM, etc.), a magneto-optical storage media (such as MO, etc.) and so on.

Thus, the present disclosure also provides a storage medium, such as, a non-transitory computer storage medium, which stores a data processing program. The data processing program is configured to execute foregoing technical solutions in the present disclosure.

It should be noted that, the playback device shown in FIG. 9 is only a specific example, which may be implemented by a structure different from that in the embodiment. For example, when executing foregoing instruction codes, an operation completed may also be implemented by a specific ASIC. In addition, foregoing processor 910 may be one or more. When there are multiple processors 910, the multiple processors are in charge of reading and executing the instruction codes. Thus, a specific structure of a test equipment is not limited by the present disclosure.

In view of above, in the embodiments of the present disclosure, when receiving an information playing request, the playback device displays the received information on a currently played image frame, by avoiding the facial feature. By adopting foregoing technical solutions, information may be displayed by avoiding facial feature on a video image, thereby improving video-image processing functions of the playback device.

The foregoing is only preferred embodiments of the present disclosure, which is not for use in limiting the present disclosure. Any modifications, equivalent substitutions, or improvements made within the spirit and principle of the present disclosure, should be covered by the present disclosure.

The invention claimed is:

1. A method for displaying information on a video image, which is applied to a playback device, the method comprising:
   receiving, by the playback device, an information playing request;
   analyzing, by the playback device, an image frame from a currently played video;
   identifying, by the playback device, a facial feature from the analyzed image frame;
   determining, by the playback device, a position of the identified facial feature in the image frame; and,
   displaying, by the playback device, received information on a position of the image frame, except for the determined position of the facial feature;
   wherein the method further comprises:
   when determining the position of the identified facial feature in the image frame, recording the position of the facial feature in the image frame;
   after analyzing the image frame from the currently played video, and before identifying the facial feature from the analyzed image frame, determining whether the position of the facial feature in the image frame has been recorded locally; and
   when determining that the position of the facial feature in the image frame has been recorded locally, displaying the received information on the position of the image frame, except for the determined position of the facial feature; otherwise, identifying the facial feature from the analyzed image frame.

2. The method according to claim 1, further comprising:
   when analyzing the image frame from the currently played video, recording the information for the image frame;
   before displaying the received information on the position of the image frame, except for the determined position of the facial feature, determining, by the playback device, whether other information has been recorded for the image frame, in addition to the received information; when other information has been recorded for the image frame, in addition to the received information, displaying, by the playback device, all the information for the image frame on the position of the image frame, except for the determined position of the facial feature; otherwise, displaying the received information on the position of the image frame, except for the determined position of the facial feature.

3. The method according to claim 1, wherein the position of the facial feature in the image frame is identified by an area, which corresponds to pixels at edge of the facial feature in the image frame.

4. The method according to claim 1, wherein the received information comprises at least one of: subtitle information, advertisement information, barrage information, or picture information.

5. The method according to claim 1, further comprising:
   when analyzing the image frame from the currently played video, recording the information for the image frame;
   before displaying the received information on the position of the image frame, except for the determined position of the facial feature, determining, by the playback device, whether other information has been recorded for the image frame, in addition to the received information; when other information has been recorded for the image frame, in addition to the received information, displaying, by the playback device, all the information for the image frame on the position of the image frame, except for the determined position of the facial feature; otherwise, displaying the received information on the position of the image frame, except for the determined position of the facial feature.

6. The method according to claim 1, wherein the position of the facial feature in the image frame is identified by an area, which corresponds to pixels at edge of the facial feature in the image frame.

7. The method according to claim 1, wherein the received information comprises at least one of: subtitle information, advertisement information, barrage information, or picture information.

8. A device for displaying information on a video image, which is applied to a playback device, comprising a processor and a memory, wherein the memory stores a receiving unit, an analyzing unit, an identifying unit, a determining unit and a displaying unit, when being executed by the processor,
   the receiving unit is configured to receive an information playing request;
   the analyzing unit is configured to analyze an image frame from a currently played video;
   the identifying unit is configured to identify a facial feature from the image frame;
   the determining unit is configured to determine a position of the identified facial feature in the image frame; and,
   the displaying unit is configured to display received information on a position of the image frame, except for the determined position of the facial feature;
   wherein the memory further stores a recording unit, when being executed by the processor;
   the recording unit is to record the position of the facial feature of the image frame, according to the determined position of the identified facial feature in the image frame;
   after analyzing the image frame from the currently played video, the determining unit is further to determine whether the position of the facial feature in the image frame has been recorded; and when determining that the position of the facial feature in the image frame has been recorded, the determining unit is further to trigger to display the received information on the position of the image frame, except for the determined position of the facial feature; otherwise, trigger to identify the facial feature from the analyzed image frame.

9. The device according to claim 8, wherein the memory further stores a recording unit, when being executed by the processor, the recording unit is further configured to record the information for the image frame, when analyzing the image frame from the currently played video;

before displaying the received information on the position of the image frame, except for the determined position of the facial feature, the displaying unit is further to determine, whether other information for the image frame has been recorded, in addition to the received information;

when determining that other information for the image frame has been recorded, in addition to the received information, the displaying unit is further to trigger to display all the information of the image frame on the position of the image frame, except for the determined position of the facial feature; otherwise, trigger to display the received information on the position of the image frame, except for the determined position of the facial feature.

10. The device according to claim 8, wherein the position of the facial feature in the image frame is identified by an area, which corresponds to pixels at edge of the facial feature in the image frame.

11. The device according to claim 8, wherein the received information comprises at least one of: subtitle information, advertisement information, barrage information, picture information.

12. The device according to claim 8, wherein the memory further stores a recording unit, when being executed by the processor, the recording unit is further configured to record the information for the image frame, when analyzing the image frame from the currently played video;

before displaying the received information on the position of the image frame, except for the determined position of the facial feature, the displaying unit is further to determine, whether other information for the image frame has been recorded, in addition to the received information;

when determining that other information for the image frame has been recorded, in addition to the received information, the displaying unit is further to trigger to display all the information of the image frame on the position of the image frame, except for the determined position of the facial feature; otherwise, trigger to display the received information on the position of the image frame, except for the determined position of the facial feature.

13. The device according to claim 8, wherein the position of the facial feature in the image frame is identified by an area, which corresponds to pixels at edge of the facial feature in the image frame.

14. A non-transitory computer storage medium, which stores a computer program, wherein the computer program is configured to:

receive an information playing request;

analyze an image frame from a currently played video;

identify a facial feature from the analyzed image frame;

determine a position of the identified facial feature in the image frame; and, display received information on a position of the image frame, except for the determined position of the facial feature;

wherein the computer program is further configured to:

when determining the position of the identified facial feature in the image frame, record the position of the facial feature in the image frame;

after analyzing the image frame from the currently played video, and before identifying the facial feature from the analyzed image frame, determine whether the position of the facial feature in the image frame has been recorded locally; and when determining that the position of the facial feature in the image frame has been recorded locally, display the received information on the position of the image frame, except for the determined position of the facial feature; otherwise, identify the facial feature from the analyzed image frame.

15. The non-transitory computer storage medium according to claim 14, wherein the computer program is further configured to:

when analyzing the image frame from the currently played video, record the information for the image frame;

before displaying the received information on the position of the image frame, except for the determined position of the facial feature, determine whether other information has been recorded for the image frame, in addition to the received information; when other information has been recorded for the image frame, in addition to the received information, display all the information for the image frame on the position of the image frame, except for the determined position of the facial feature; otherwise, display the received information on the position of the image frame, except for the determined position of the facial feature.

16. The non-transitory computer storage medium according to claim 14, wherein the position of the facial feature in the image frame is identified by an area, which corresponds to pixels at edge of the facial feature in the image frame.

17. The non-transitory computer storage medium according to claim 14, wherein the received information comprises at least one of: subtitle information, advertisement information, barrage information, or picture information.

* * * * *